United States Patent
Lee

[11] Patent Number: 5,941,796
[45] Date of Patent: Aug. 24, 1999

[54] FEEDBACK CONTROL OF THE LINE PRESSURE DURING A DOWNSHIFT

[75] Inventor: Hee-Yong Lee, Kaepo-Dong, Rep. of Korea

[73] Assignee: Hyundai Motor Company Ltd., Seoul, Rep. of Korea

[21] Appl. No.: 08/802,261

[22] Filed: Feb. 19, 1997

Related U.S. Application Data

[63] Continuation-in-part of application No. 08/416,575, Apr. 4, 1995, Pat. No. 5,637,055.

[30] Foreign Application Priority Data

Apr. 8, 1994 [KR] Rep. of Korea ......................... 94-7341

[51] Int. Cl.[6] ........................................... F16H 61/26
[52] U.S. Cl. .......................... 477/158; 477/144; 477/156
[58] Field of Search .................................... 477/143, 144, 477/146, 148, 154, 155, 156, 158

[56] References Cited

U.S. PATENT DOCUMENTS

| | | |
|---|---|---|
| 4,742,732 | 5/1988 | Hiramatsu . |
| 4,793,216 | 12/1988 | Hiramatsu et al. ...................... 477/148 |
| 4,829,435 | 5/1989 | Isono . |
| 4,905,545 | 3/1990 | Leising et al. ....................... 477/148 X |
| 4,989,477 | 2/1991 | Hunter et al. ........................... 477/148 |
| 4,998,451 | 3/1991 | Sano ...................................... 477/155 X |
| 5,016,495 | 5/1991 | Takizawa . |
| 5,029,494 | 7/1991 | Lentz et al. .............................. 477/148 |
| 5,036,729 | 8/1991 | Nitz et al. ................................ 477/148 |
| 5,054,336 | 10/1991 | Takizawa . |
| 5,063,814 | 11/1991 | Baba et al. ........................... 477/154 X |
| 5,113,722 | 5/1992 | Iizuka . |
| 5,142,945 | 9/1992 | Shimanaka ........................... 477/155 X |
| 5,161,432 | 11/1992 | Matsumoto et al. . |
| 5,393,278 | 2/1995 | Kyushima et al. ....................... 477/120 |
| 5,443,473 | 8/1995 | Fujita et al. ............................. 477/155 |
| 5,445,579 | 8/1995 | Fujita et al. ......................... 477/155 X |
| 5,505,675 | 4/1996 | Kuriyama et al. ....................... 477/156 |
| 5,596,495 | 1/1997 | Brown et al. ........................ 477/148 X |
| 5,762,581 | 12/1998 | Kozaki et al. ....................... 477/109 X |
| 5,848,370 | 1/1999 | Kozaki et al. ........................... 477/155 |

*Primary Examiner*—Khoi Q. Ta

[57] ABSTRACT

The shift control system and method for an automatic transmission of a vehicle, wherein the automatic transmission includes a hydraulic control system controlling a plurality of friction elements, senses vehicle operating conditions. Based on the sensed vehicle operating conditions, a control unit decides whether to perform a downshift from a higher speed stage to a lower speed stage. The control unit also feedback controls the hydraulic pressure in the hydraulic control system during the downshift when the control unit decides to perform such a downshift. The feedback control serves to lengthen the downshift operation such that shift shock is reduced.

22 Claims, 6 Drawing Sheets

FEEDBACK CONTROL OF THE LINE PRESSURE DURING A DOWNSHIFT

This application is a continuation-in-part of application Ser. No. 08/416,575 filed on Apr. 4, 1995 now U.S. Pat. No. 5,637,055, the entire contents of which are hereby incorporated by reference.

BACKGROUND OF THE INVENTION

1. Field of the Invention

The present invention relates to a shift control system for an automatic transmission of a vehicle and more particularly, to an improved shift control system for a vehicle automatic transmission which can prevent a shift shock of the automatic transmission.

2. Description of Related Art

Generally, a transmission increases or decreases rotating power and rotating speed of an engine according to a driving condition of a vehicle, and also functions in an off-position wherein power from the engine is not transmitted to the driving wheels for a certain period of time so as to allow the engine to warm-up. The transmission industry classifies a manual transmission by manual operation, and an automatic transmission by automatic operation.

The automatic transmission related to the present invention is convenient to operate, enables the vehicle to start smoothly, to increase and decrease the car speed, and is less likely to stall when driven by a novice driver. Therefore, this automatic transmission is a popular choice among drivers.

The automatic transmission has "D", "2", "L", "N", "P", and "R" operating ranges. In the "D" range the automatic transmission shifts in multiple speed stages according to the degree the accelerator pedal is depressed (or, alternatively the throttle opening degree). The "2" range is for driving on a long downward sloping road, and the "L" range is for driving on an extremely downward sloping and curving road.

In the "N" range, the automatic transmission does not transfer power from the engine to the driving wheels, and does not place a load on the engine. In the "P" range, the automatic transmission fixes an output shaft of the automatic transmission while the vehicle is parked, and in the "R" range, the automatic transmission causes the vehicle to operate in reverse.

In the "D" range, the vehicle starts in a 1-speed or 2-speed state without any relation to the opening degree of a throttle valve or depression of the accelerator pedal, and causes an upshift to the 2-speed or 3-speed state according to the car speed.

Also, if the throttle valve is gradually opened, a driving gear of the 1-speed, 2-speed, and 3-speed has an increasingly higher shift point thereof. If the car speed decreases, the downshift automatically occurs. In this 3-speed or 2-speed state of the "D" range, if the accelerator pedal is depressed completely in order to suddenly accelerate the car, the automatic transmission enters a kick down state by downshifting from the 3-speed to 2-speed or the 2-speed to 1-speed.

The automatic transmission is provided with a hydraulic control system to control shifting by automatically operating brake bands and clutches of the transmission's star gear unit (i.e., planetary gear unit) according to the car speed, the engine loading degree (i.e., throttle opening degree or depression of the accelerator pedal), and position of the shifting lever (i.e. the selected operating range of the automatic transmission).

The hydraulic control system is controlled by a transmission control unit (TCU), and a fluid load of a line pressure controlled by manually operated valves. The TCU implements an open loop control system. Therefore, the star gear unit located at a rear portion of a torque converter performs an upshift or a downshift under the control of this open loop system. The TCU outputs control signals to shift control solenoids in the hydraulic control system based on the operating state of the vehicle and engine therefor. In response to the operation of the shift control solenoids, a shift control valve supplies hydraulic fluid, and thus pressure, to a plurality of valve bodies. The valve bodies in turn regulate the application of hydraulic pressure to the front clutch, the rear clutch, the end clutch, and the kick down brake of the automatic transmission. Additionally, the TCU outputs a control signal to a pressure control solenoid which regulates the hydraulic pressure applied to the front clutch, the rear clutch, the end clutch, and the kick down brake band via the valve bodies.

In the "D" range, shifting between the 1-speed to 4-speed, or recently, the 1-speed to 5-speed is accomplished in multiple stages. In detail, a rear clutch and a one-way clutch operate in the 1-speed state, the rear clutch and a kick down brake band operate in the 2-speed state, a front clutch, an end clutch, and the rear clutch operate in the 3-speed state, and the end clutch and the kick down brake band operate in the 4-speed state.

Such conventional shift control systems, however, suffer from a number of problems. For example, shift shock occurs due to an incomplete return operation of a kick down piston in the kick down brake during the 3 to 2-speed downshift operation when downshifting from 4-speed to 1-speed and when the engine and the vehicle operate at a low speed. Additionally, shift shock occurs when shifting from the 3-speed to the 2-speed state since a large speed difference is created in a short period of time between the input and output shafts of the automatic transmission; particularly, when the engine provides a large amount of torque.

SUMMARY OF THE INVENTION

Accordingly, it is an object of the present invention to provide a shift control system and method for an automatic transmission of a vehicle which eliminates the above problems encountered with conventional control systems and methods.

Another object of the present invention is to provide a shift control system and method for an automatic transmission of a vehicle which feedback controls the pressure applied to the friction elements to eliminate shift shock.

These and other objects are achieved by providing a shift control method for an automatic transmission of a vehicle, said automatic transmission including a hydraulic control system controlling a plurality of friction elements, comprising: (a) sensing vehicle operating conditions; (b) determining whether to perform a downshift from a higher speed stage to a lower speed stage based on said vehicle operating conditions; and (c) feedback controlling hydraulic pressure in said hydraulic control system during said downshift when said step (b) determines to perform said downshift.

These and other objects are further achieved by providing a shift control system for an automatic transmission of a vehicle, said automatic transmission including a hydraulic control system controlling a plurality of friction elements, comprising: sensing means for sensing vehicle operating conditions; shift determining means for determining whether to perform a downshift from a higher speed stage to a lower speed stage based on said vehicle operating conditions; and control means for feedback controlling hydraulic pressure in said hydraulic control system during said downshift when said shift determining means determines to perform said downshift.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DESCRIPTION OF THE PREFERRED EMBODIMENTS

Figure 1:
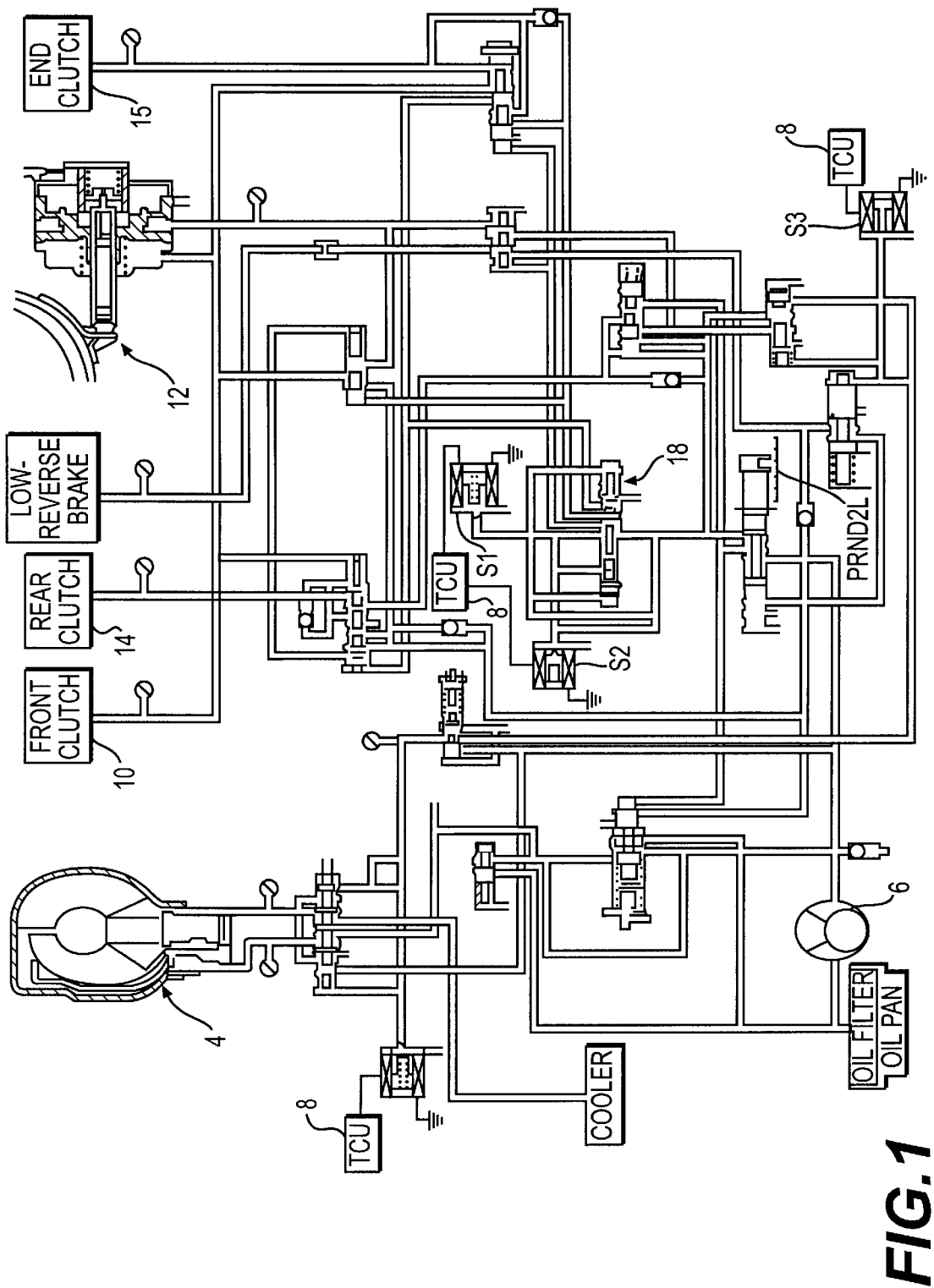
FIG. 1 is a schematic view of a shift control system for an automatic transmission of a vehicle of the present invention.

FIG. 1 illustrates the hydraulic control system controlled by the transmission control system of the present invention. As shown in FIG. 1, the hydraulic control system includes a fluid pump 6 operated by torque converter 4. The torque converter 4 transfers power from the engine to the automatic transmission. The automatic transmission is a 4-speed automatic transmission employing a star gear unit (i.e., planetary gear unit) which transfers engine power received by the torque converter 4 to the driving wheels according to a selected one of the four possible speeds. Shifting between the four possible speed stages is accomplished via operation of a plurality of friction elements. The friction elements include a front clutch 10, a rear clutch 14, a kick down brake band 12, and an end clutch 15 which selectively connect or disconnect elements of the star gear unit to one another, or to a fixed housing of the automatic transmission.

As shown in FIG. 1, the hydraulic control system includes a plurality of valve bodies having a plurality of valves for controlling hydraulic pressure applied to each one of the front clutch 10, the rear clutch 14, the kick down brake band 12, and the end clutch 15. The operation of the various valve bodies is controlled via the operation of a shift control valve 18, and operation of the shift control valve 18 is controlled by shift control solenoids S1 and S2. A detail discussion of the operation of the hydraulic control system is provided in U.S. application Ser. No. 08/450,861 hereby incorporated by reference. A transmission control unit (TCU) 8 controls shifting in the automatic transmission by controlling the shift control solenoids S1 and S2 based on operating conditions of the vehicle and the engine therefor.

Specifically, in the "D" range of the automatic transmission, the TCU 8 controls multiple stage shifts from a 1-speed to a 4-speed. In 1-speed, the TCU 8 energizes both the first and second shift control solenoids S1 and S2. Consequently, the rear clutch 14 is operated as well as a 1-way clutch (not shown). In the 2-speed stage, the TCU 8 de-energizes the first shift control solenoid S1 and energizes the second shift control solenoid S2. As a result, the rear clutch 14, and the kick down brake band 12 operate. In the 3-speed stage, the TCU 8 de-energizes both the first and second shift control solenoids S1 and S2. Consequently, the front clutch 10, the end clutch 15 and the rear clutch 14 operate. In the 4-speed stage, the TCU 8 energizes the first shift control solenoid S1 and de-energizes the second shift control solenoid S2. Accordingly, the end clutch 15 and the kick down brake band 12 operate.

Besides controlling the shift control solenoids S1 and S2, the TCU 8 also controls the pressure control solenoid valve S3. Through control of the pressure control solenoid valve S3, the TCU 8 can control hydraulic pressure applied to the front clutch 10, rear clutch 14, the kick down brake band 12, and the end clutch 15. In summary, the shift control solenoids S1 and S2 control whether hydraulic pressure is applied to one of the shift elements, while the pressure control solenoid valve S3 controls the magnitude of the hydraulic pressure applied to those friction elements.

Figure 2:
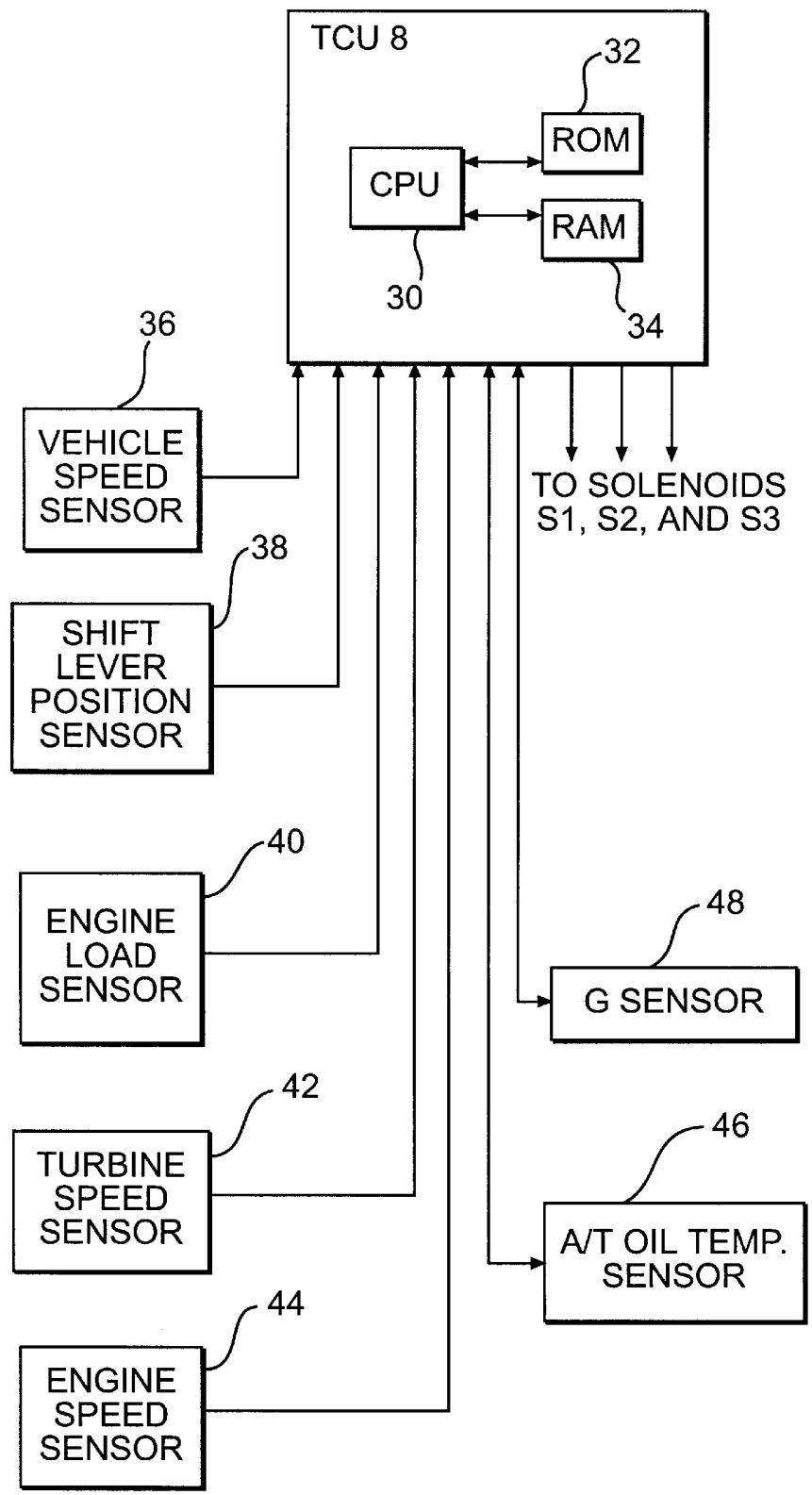
FIG. 2 is a block diagram of the transmission control unit according to the present invention.

FIG. 2 is a block diagram of the TCU 8. As shown in FIG. 2, the TCU 8 includes a central processing unit (CPU) 30 connected to a read only memory (ROM) 32 and a random access memory (RAM) 34. The ROM 32 stores the program run by the CPU 30, and stores any default values. The RAM 34 stores data and intermediate calculation values produced by the CPU 30 in the course of running the program stored in ROM 32. The TCU 8 receives and stores a plurality of sensor outputs to determine the operating conditions of the vehicle and the engine therefor. For instance, FIG. 2 illustrates that the TCU 8 receives the output of a vehicle speed sensor 36, a shift lever position sensor 38, an engine load sensor 40, a turbine speed sensor 42, an engine speed sensor 44, an automatic transmission (A/T) temperature sensor 46 and a gravity (g) sensor 48. One skilled in the art will readily appreciate, that the TCU 8 receives many other sensor outputs which have not been shown in FIG. 2 for the purposes of clarity.

Based on the sensor outputs, the TCU 8 generates and supplies control signals to shift control solenoids S1 and S2 as well as the pressure control solenoid valve S3. The vehicle speed sensor 36 outputs a signal indicating the vehicle speed, and the turbine speed sensor 42 outputs the speed of the turbine in the torque convertor 4. As one skilled in the art knows, the turbine is connected to the input shaft of the automatic transmission. Accordingly, based on both the turbine speed and the vehicle speed, the TCU 8 can readily determine the transmission speed ratio (i.e., the speed stage or state) of the automatic transmission. The shift lever position sensor 38 indicates whether the automatic transmission has been placed in the "P", "R", "D", "N", "2", or "L" range. The engine load sensor 40 indicates the load on the engine. For instance, the engine load sensor 40 could be a throttle valve opening degree sensor or an acceleration pedal depression degree sensor. The sensor 48 measures acceleration in the longitudinal direction of the vehicle.

Figure 3:
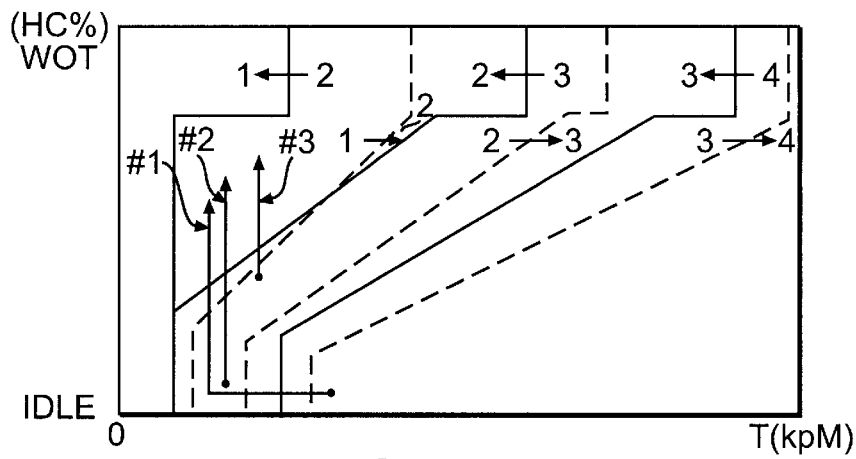
FIG. 3 illustrates a shift control pattern employed by the transmission control unit of the present invention.

As discussed above, the TCU 8 controls the shift operation of the automatic transmission. Specifically, either one of the ROM 32 or RAM 34 stores a shift pattern such as shown in FIG. 3, and based on this shift pattern the TCU 8 decides when to effect an upshift or downshift. As shown in FIG. 3, upshifting or downshifting is determined based on a detected vehicle speed and engine load, where WOT in FIG. 3 stands for wide open throttle. In the shift pattern of FIG. 3, upshift boundaries are shown by dashed lines, while downshift boundaries are shown by solid lines. FIG. 3 further illustrates three possible conditions leading to a 3–2 speed downshift. Downshift scenario 1 is known as a tip-in downshift. A tip-in downshift occurs when a low load is placed on the engine, the vehicle speed reduces such that the TCU 8 decides to perform a 4–3 speed downshift operation, and then the TCU 8 decides to perform a 3–2 speed downshift operation in response to a sudden heavy load placed on the engine. Downshift scenario 2 illustrates a kick down downshift which occurs when the vehicle is travelling at a low speed, and a high load is suddenly placed on the engine. The third downshift scenario 3, is a power-on downshift. As shown in FIG. 3, a power-on downshift occurs when the engine experiences a moderate load at greater than a predetermined speed, and a greater load is then placed on the engine.

As discussed above in the Background of the Invention section with respect to conventional control systems, the conventional control system will control the automatic transmission such that a shift shock is experienced in any one of the three downshift scenarios discussed with respect to FIG. 3. By contrast, the automatic transmission control system of the present invention substantially reduces the shift shock in these instances. Control of the hydraulic control system according to the present invention will now be described with respect to FIGS. 4–7.

Figure 4:
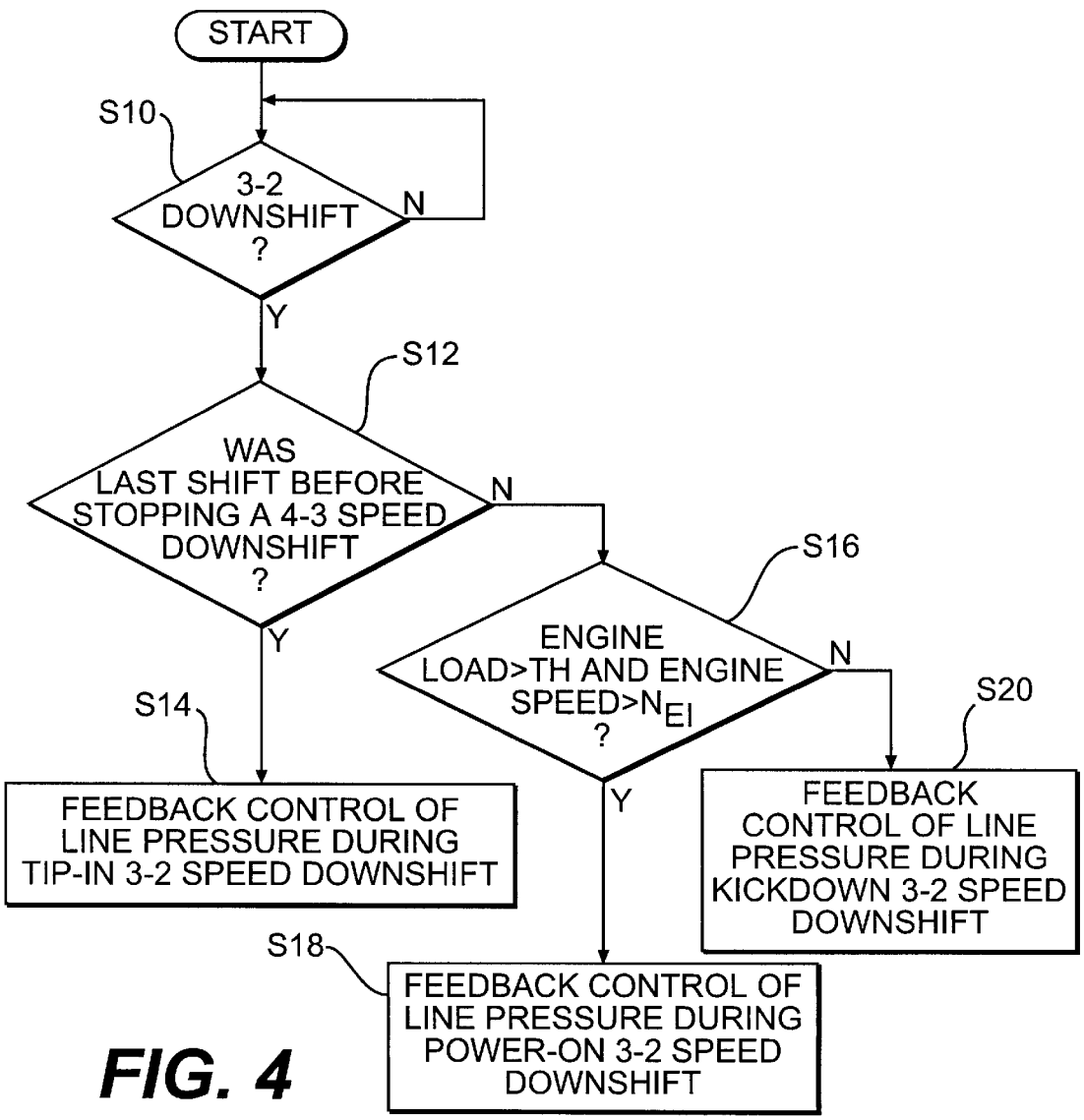
FIG. 4 is a high level logic flow chart of the shift control method of the present invention.

FIG. 4 illustrates a high level logic flow chart of the downshift control operation when performing a 3–2 speed downshift. In step S10, the TCU 8 monitors the vehicle and engine operating characteristics to determine when the automatic transmission should be downshifted from the 3-speed stage to the 2-speed stage. When this downshift determination is made, processing proceeds to step S12. In step S12, the TCU 8 determines whether or not the proceeding shift made by the automatic transmission before the vehicle has stopped was a 4–3 speed downshift. If the proceeding shift was a 4–3 speed downshift, then processing proceeds from step S12 to step S14. In step S14, the TCU 8 implements tip-in feedback control of the 3–2 speed downshift operation. This feedback control operational is discussed in detail below.

If in step S12, the TCU 8 determines that the previous shift was not a 4–3 speed downshift operation, then processing proceeds to step S16. In step S16, the TCU 8 reads the engine load and engine speed values stored in the RAM 34 prior to the 3–2 speed downshift determination in step S12, and compares the read engine load and engine speed values to a load threshold TH and engine speed threshold $N_{EI}$, respectively. If both of the read values are greater then the threshold values, then processing proceeds to step S18. In step S18, the TCU 8 performs power-on feedback control of the 3–2 speed downshift. This feedback control operation is discussed in detail below.

If, however, at least one of the read values does not exceed the respective threshold value, then the TCU 8 determines a high torque state for the engine and processing proceeds to S20. In step S20, the TCU 8 performs kick down feedback control for the 3–2 speed downshift. This feedback control is discussed in detail below.

Next, the feedback control operation will be described. The feedback control operation will be discussed with respect to FIGS. 5–7. The feedback control operation is performed with respect to the pressure control solenoid valve S3. Namely, the TCU 8 controls the shift control solenoids S1 and S2 in the conventional manner, but feedback controls the pressure control solenoid valve S3. More specifically, the TCU 8 feedback controls the duty ratio applied to the pressure control solenoid valve S3.

Conventionally, when shifting from 3-speed to 2-speed the front clutch 10 is released and the kick down brake band 12 is applied in a very short period of time. When this occurs at a low vehicle speed, a large shift shock can be felt by the driver if the input torque (torque supplied by the engine to the transmission) is large. The shift shock results from creating a large difference between the speed of the input shaft and the output shaft for the automatic transmission in a short period of time.

Figure 7:
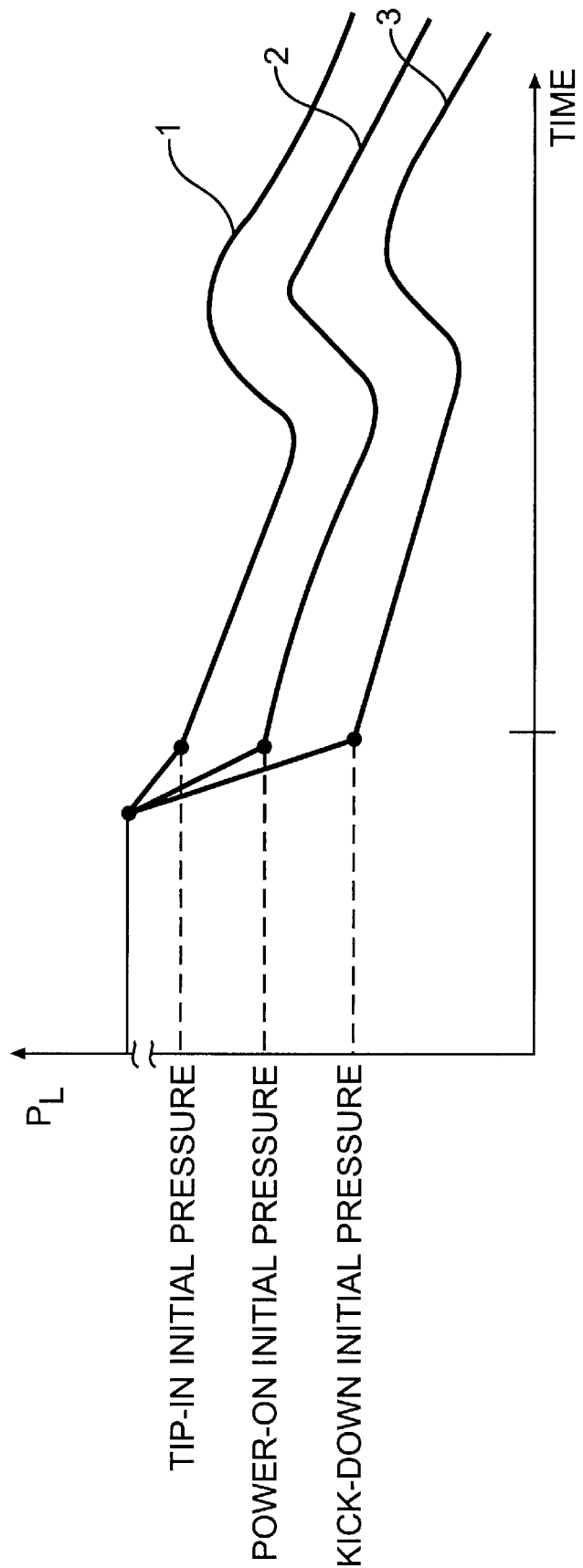
FIG. 7 illustrates the hydraulic pressure with respect to time during a 3–2 speed downshift.

By feedback controlling the duty ratio applied to the pressure control solenoid valve S3, the TCU 8 can prohibit a sudden increase in the input shaft speed by slowly releasing hydraulic pressure from the front clutch 10. Subsequently, the TCU 8 in accordance with the feedback control, completes the shift by applying the kick down brake band 12 in a short period of time by increasing the hydraulic pressure applied thereto. Controlling the hydraulic pressure in this manner lengthens the shift operation, and more slowly creates the speed difference between the input and output shafts of the transmission. Consequently, shift shock during a 3–2 speed downshift is significantly reduced. FIG. 7 illustrates the change in hydraulic pressure which occurs during the feedback control according to the present invention.

Figure 5:
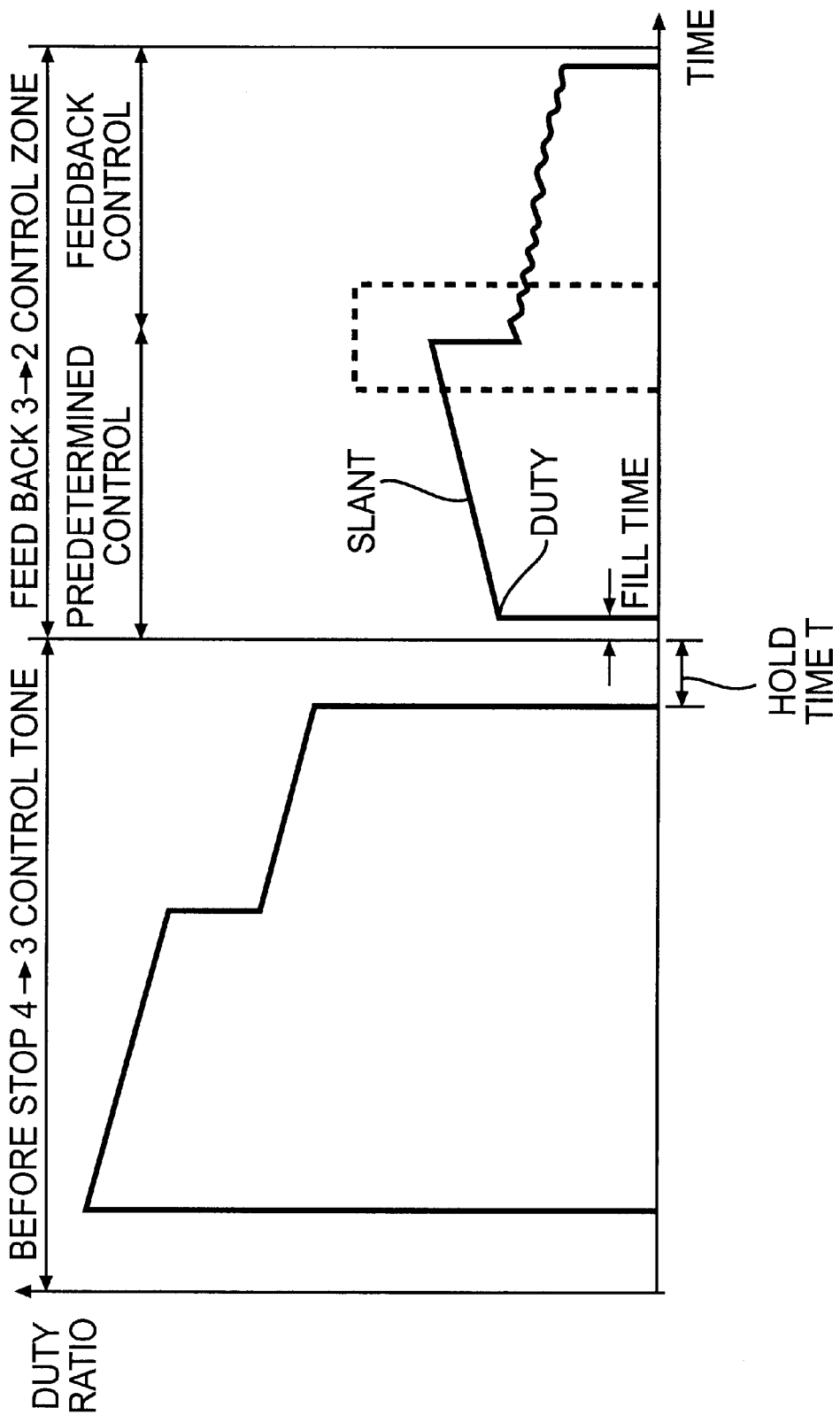
FIG. 5 illustrates the duty ratio applied to the pressure control solenoid valve during a 4–3 speed downshift and a 3–2 speed downshift.

FIG. 5 illustrates the duty ratio of the signal output by TCU 8 to the pressure control solenoid valve S3 when performing a 4–3 speed downshift and a 3–2 speed downshift. As illustrated, after the completion of the 4–3 speed downshift, the TCU 8 delays performing a 3–2 speed downshift operation for a holding time T. The holding time T is the amount of time required for the kick down piston of the kick down brake band 12 to fully return. After the holding time T, the 3–2 speed downshift operation can begin.

Initially, the TCU 8 sets the duty ratio of the pressure control solenoid valve S3 to a predetermined initial value. The TCU 8, however, sets a different initial value depending upon whether the 3–2 downshift is a tip-in downshift, kick down downshift, or a power-on downshift. Specifically, the initial duty ratio for the kick down downshift will be greater than the duty ratio for the power-on downshift, and the duty ratio for the power-on downshift will be greater than the duty ratio for the tip-in downshift. For example, in a preferred embodiment, the initial value for the duty ratio during the kick down downshift is 23%, for the power-on downshift is 19% and for the tip-in downshift is 15%. Consequently, as shown in FIG. 7, the tip-in initial pressure is greater than the power-on initial pressure, and the power-on initial pressure is greater than the kick down initial pressure. It should be understood, however, that the above initial duty ratios are merely provided by way of example, and in no way limit the initial duty ratios which may be set.

Furthermore, the initial duty ratios are adjusted based on the A/T oil temperature detected by the A/T oil temperature sensor 46. When the A/T oil temperature is low, viscosity of the A/T oil is high. Consequently, while a particular initial pressure will be achieved for a particular duty ratio applied to the pressure control solenoid valve S3 when the A/T oil temperature is above a predetermined temperature, when the A/T oil temperature is below the predetermined temperature, the same particular duty ratio produces an initial pressure which is actually lower than the desired particular initial pressure. When the TCU 8, via the A/T oil temperature sensor 46, detects that the A/T oil temperature is below the predetermined temperature, the TCU 8 lowers the initial duty ratio chosen by a predetermined amount so that the desired initial pressure will be achieved.

As shown in FIG. 5, the TCU 8 then increases the duty ratio from the predetermined initial duty ratio at a predetermined fixed rate for a predetermined period of time. Upon reaching the end of this predetermined period of time, feedback control of the duty ratio begins.

Figure 6:
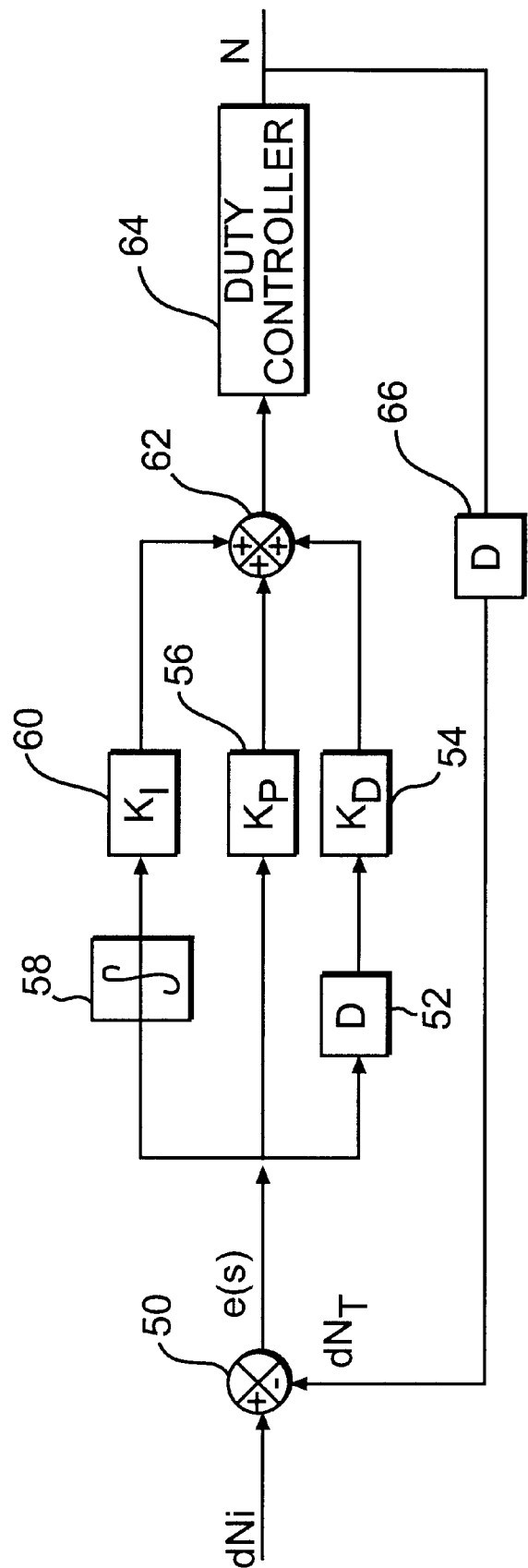
FIG. 6 illustrates the feedback control loop implemented by the transmission control unit according to the present invention.

FIG. 6 illustrates a block diagram of the feedback control loop implemented by the TCU 8. Based on the output of the g sensor 48, the TCU 8 reads a G value from a table stored in ROM 32 or RAM 34. The G values have been empirically determined to minimize shift shock. The TCU 8 then multiples the G value by the gear ratio to establish a target turbine acceleration $dN_i$.

The target turbine acceleration $dN_i$ is received by a subtractor 50 which subtracts an actual changing ratio for the turbine speed dNT therefrom, and outputs an error signal $e_s$. The error signal $e_s$ is received by differentiator 52 which differentiates the error signal $e_s$, and outputs the differentiated error signal to a gain control circuit 54 which amplifies the differentiated error signal by a differential gain $k_D$. The error signal $e_s$ is also received by a proportional gain circuit 56 which amplifies the error signal $e_s$ by a proportional gain $k_T$. Furthermore, the error signal $e_s$ is received and integrated by an integrator 58, and amplified by an integral gain circuit 60. The integral gain circuit 60 amplifies the integrated error signal by an integral gain $k_I$. An adder 62 receives and adds the output of the integral gain circuit 60, the proportional gain circuit 56 and the differential gain circuit 54. The summation value output by adder 62 is then input by a duty controller 64 which calculates a new duty ratio by adding the previous duty ratio to the output of the adder 62. The duty controller 64 then controls the duty ratio of the pressure control solenoid valve S3 according to the calculated duty ratio.

The TCU 8 detects the turbine speed via the turbine speed sensor 42, as the duty control is being performed by the duty controller 64. This actual turbine speed is then differentiated by differentiator 66 to determine the actual changing ratio of the turbine speed $dN_T$, and this actual turbine acceleration $dN_T$ is then output to the subtractor 50.

By performing feedback control in this manner, the front clutch 10 is released more slowly which lengthens the shift operation and more slowly creates the speed difference (2-speed) between the input and output shafts of the automatic transmission. As a result, shift shock during a 3–2 speed downshift is significantly reduced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A shift control method for an automatic transmission of a vehicle, said automatic transmission including a hydraulic control system controlling a plurality of friction elements, said hydraulic control system including a plurality of valve bodies controlling supply of hydraulic pressure to said friction elements, a shift control valve controlling operation of said valve bodies, and a pressure control solenoid valve controlling a pressure of hydraulic pressure supplied to said valve bodies, the method comprising:

(a) sensing vehicle operating conditions;

(b) determining whether to perform a downshift from a higher speed stage to a lower speed stage based on said vehicle operating conditions; and (c) feedback controlling said pressure control solenoid valve during said downshift when said step (b) determines to perform said downshift.

2. The method of claim 1, prior to said step (c), further comprising:

(d) performing predetermined control of said pressure control solenoid valve for a predetermined period of time during said downshift.

3. The method of claim 2, prior to said step (d), further comprising:

(e) determining a mode of said downshift when said step (b) determines to perform said downshift based on said vehicle operating conditions; and wherein
said step (d) performs predetermined control of said pressure control solenoid valve to set an initial pressure of said hydraulic pressure supplied to said valve bodies based on said determined mode.

4. The method of claim 3, wherein
said step (a) includes the steps of,
(a1) detecting a load on an engine of said vehicle, and
(a2) detecting a speed of said engine;
said step (b) determines to perform a downshift from a third speed stage to a second speed stage; and
said step (e) includes the steps of,
(e1) determining whether a fourth speed stage to third speed stage downshift occurred prior to said vehicle stopping and said step (b) determining to perform said third speed stage to second speed stage downshift;
(e2) establishing a tip-in mode if said step (e1) determines that a fourth speed stage to third speed stage downshift occurred prior to said vehicle stopping and said step (b) determining to perform said third speed stage to second speed stage downshift;
(e3) comparing said detected engine speed to a first threshold value if said step (e1) does not determine that a fourth speed stage to third speed stage downshift occurred prior to said vehicle stopping and said step (b) determining to perform said third speed stage to second speed stage downshift;
(e4) comparing said detected engine load to a second threshold value if said step (e1) does not determine that a fourth speed stage to third speed stage downshift occurred prior to said vehicle stopping and said step (b) determining to perform said third speed stage to second speed stage downshift; and
(e5) establishing one of a power-on mode and a kick down mode based on output of said steps (e3) and (e4).

5. The method of claim 4, wherein said step (d) performs predetermined control of said pressure control solenoid valve to set said initial pressure such that an initial pressure in said tip-in mode is greater than an initial pressure in said power-on mode, and said initial pressure in said power-on mode is greater than an initial pressure in said kick down mode.

6. The method of claim 2, wherein said step (d) outputs predetermined duty ratios to said pressure control solenoid valve to perform said predetermined control; and said step (c) feedback controls a duty ratio of said pressure control solenoid valve to perform said feedback.

7. The method of claim 1, wherein said automatic transmission includes a torque converter having a turbine, impeller and a stator, and wherein said step (a) includes the step (a1) of detecting an actual speed of said turbine; and said step (c) comprises the steps of, (c1) setting a target turbine acceleration based on said vehicle operating conditions;

(c2) generating an error signal from said target turbine acceleration and an actual turbine acceleration;

(c3) generating a duty ratio for said pressure control solenoid valve of said hydraulic control system based on said error signal; and (c4) differentiating said actual turbine speed to obtain said actual turbine acceleration.

8. The method of claim 7, wherein said step (c) further comprises:

(c5) generating a proportional error signal by multiplying said error signal by a predetermined constant;

(c6) generating a differential error signal by differentiating said error signal;

(c7) generating an integral error signal by integrating said error signal; and wherein said step (c3) generates said duty ratio for said pressure control solenoid valve based on said proportional error signal, said differential error signal, and said integral error signal.

9. The method of claim 7, wherein said step (a) includes step (a2) sensing acceleration in a longitudinal direction of said vehicle; and said step (c1) includes the steps of, (c11) accessing a predetermined value from a memory based on output of said (a2), and (c12) setting said target turbine acceleration based on said predetermined value.

10. The method of claim 1, wherein said step (c) feedback controls said pressure control solenoid valve during said downshift such that a period of time to perform said downshift increases.

11. A shift control system for an automatic transmission of a vehicle, said automatic transmission including a a plurality of friction elements, comprising:

a plurality of valve bodies controlling supply of hydraulic pressure to said plurality of friction elements;

a shift control valve controlling operation of said valve bodies;

a pressure control solenoid valve controlling a pressure of hydraulic pressure supplied to said valve bodies;

sensing means for sensing vehicle operating conditions;

shift determining means for determining whether to perform a downshift from a higher speed stage to a lower speed stage based on said vehicle operating conditions; and control means for feedback controlling said pressure control solenoid valve during said downshift when said shift determining means determines to perform said downshift.

12. The system of claim 11, wherein said control means performs predetermined control of said pressure control solenoid valve for a predetermined period of time during said downshift before performing said feedback control.

13. The system of claim 12, further comprising:

mode determining means for determining a mode of said downshift based on said vehicle operating conditions when said shift determining means determines to perform said downshift; and wherein said control means controls said pressure control solenoid valve to set an initial pressure of said hydraulic pressure supplied to said valve bodies based on said determined mode.

14. The system of claim 13, wherein said sensing means includes, a load detector detecting a load on an engine of said vehicle, and a speed detector detecting a speed of said engine;

said shift determining means determines whether to perform a third speed stage to second speed stage downshift; and said mode determining means determines whether a fourth speed stage to third speed stage downshift occurred prior to said vehicle stopping and said shift determining means determining to perform said third speed stage to second speed stage downshift, establishes a tip-in mode if said mode determining means determines that a fourth speed stage to third speed stage downshift occurred prior to said vehicle stopping and said shift determining means determining to perform said third speed stage to second speed stage downshift, first compares said detected engine speed to a first threshold value if said mode determining means does not determine that a fourth speed stage to third speed stage downshift occurred prior to said vehicle stopping and said shift determining means determining to perform said third speed stage to second speed stage downshift, second compares said detected engine load to a second threshold value if said mode determining means does not determine that a fourth speed stage to third speed stage downshift occurred prior to said vehicle stopping and said shift determining means determining to perform said third speed stage to second speed stage downshift, and establishes one of a power-on mode and a kick down mode based on output of said first and second comparison.

15. The system of claim 14, wherein said control means controls said pressure control solenoid valve to set said initial pressure such that an initial pressure in said tip-in mode is greater than an initial pressure in said power-on mode, and said initial pressure in said power-on mode is greater than an initial pressure in said kick down mode.

16. The system of claim 12, wherein said control means outputs predetermined duty ratios to said pressure control solenoid valve to perform said predetermined control, and feedback controls a duty ratio of said pressure control solenoid valve to perform said feedback control.

17. The system of claim 11, wherein said automatic transmission includes a torque converter having a turbine, impeller and a stator, and wherein said sensing means includes a turbine speed detector detecting an actual speed of said turbine; and said control means includes, setting means for setting a target turbine speed changing ratio based on said vehicle operating conditions;

an error signal generator generating an error signal from said target turbine acceleration and an actual turbine acceleration;

a duty ratio controller generating a duty ratio for said pressure control solenoid valve based on said error signal; and a differentrator differentiating said actual turbine speed to obtain said actual turbine acceleration.

18. The system of claim 17, wherein said control means further comprises:

first generating means for generating a proportional error signal by multiplying said error signal by a predetermined constant;

second generating means for generating a differential error signal by differentiating said error signal;

third generating means for generating an integral error signal by integrating said error signal; and wherein said duty ratio controller generates said duty ratio for said pressure control solenoid valve based on said proportional error signal, said differential error signal, and said integral error signal.

19. The system of claim 17, wherein said sensing means includes a g sensor sensing acceleration in a longitudinal direction of said vehicle;

said control means includes a memory storing a plurality of predetermined values each associated with an output of said g sensor; and said setting means accesses one of said plurality of predetermined values based on output from said g sensor, and sets of said target turbine speed values changing ratio based on said accessed predetermined value.

20. The system of claim 11, wherein said control means feedback controls said pressure control solenoid valve during said downshift such that a period of time to perform said downshift increases.

21. A shift control method for an automatic transmission of a vehicle, said automatic transmission including a hydraulic control system controlling a plurality of friction elements, comprising:

(a) sensing vehicle operating conditions;

(b) determining whether to perform a downshift from a higher speed stage to a lower speed stage based on said vehicle operating conditions; and (c) feedback controlling hydraulic pressure in said hydraulic control system during said downshift such that a period of time to perform said downshift increases.

22. A shift control system for an automatic transmission of a vehicle, said automatic transmission including a hydraulic control system controlling a plurality of friction elements, comprising:

sensing means for sensing vehicle operating conditions;

shift determining means for determining whether to perform a downshift from a higher speed stage to a lower speed stage based on said vehicle operating conditions; and feedback controlling hydraulic pressure in said hydraulic control system during said downshift such that a period of time to perform said downshift increases.

* * * * *